Patented June 22, 1926.

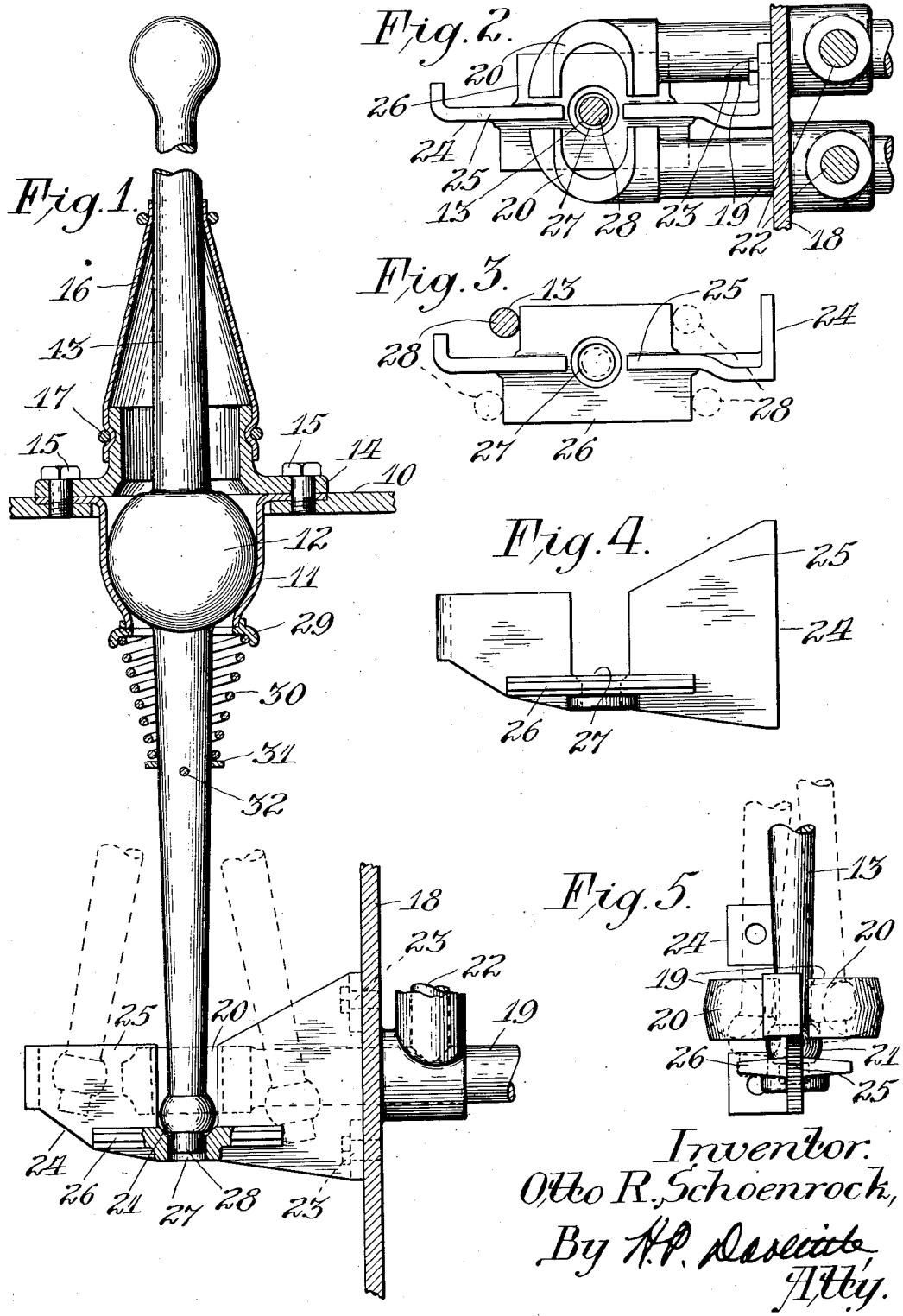

1,589,434

UNITED STATES PATENT OFFICE.

OTTO R. SCHOENROCK, OF CHICAGO, ILLINOIS, ASSIGNOR TO INTERNATIONAL HARVESTER COMPANY, A CORPORATION OF NEW JERSEY.

LOCK FOR GEAR-SHIFTING-LEVER MECHANISM.

Application filed December 4, 1924. Serial No. 753,783.

This invention relates to lever mechanisms for shifting the gears to change speeds in selective gear transmissions such as employed in automobiles and tractors. More particularly, it relates to locking mechanisms for the well-known ball shift levers, which will automatically retain such levers locked in any selected position of adjustment.

It has been found that the gears in selective sliding transmissions for the type mentioned, in time become worn and that due to such wear the gears at times unmesh, especially when driving in the low speeds necessitated by heavy loads.

Accordingly, the main object of this invention is to prevent such unmeshing of gears by providing a locking mechanism, which automatically will lock the lever in any of its positions of adjustment to wit: neutral, low, intermediate, high and reverse speeds, if applied to the conventional speed arrangement.

It is a further object to provide a novel guide and locking member adapted for use as an attachment to existing forms of lever shifts, said member cooperable with an extension on the lever to lock it in any of the positions of adjustment mentioned.

Another object is to provide a lever which is normally in a down position for locking it in a certain position of adjustment and which must be axially moved upwardly before another adjustment can be effected.

Still another object is to provide a simple and efficient mechanism of the type specified which is well adapted for commercial use.

In the accompanying sheet of drawings is illustrated the preferred embodiment of the invention. Like characters of reference denote like parts throughout the several views, and in the drawings,—

Fig. 1 is a side elevational view, partly in section, of the improved locking mechanism associated with a gear shift lever of the ball type;

Fig. 2 is a plan view of the guide member and locking plate, the lever being shown in section;

Fig. 3 is a detail plan view of the guide and locking plate and showing the lever diagrammatically in the various positions of adjustment which it may assume;

Fig. 4 is a side elevational view of the same detail shown in Fig. 3; and

Fig. 5 is a rear elevational view of the lower end of the lever in association with the guide and locking plate.

The preferred embodiment of the invention has been illustrated in connection with a four speed type of selective gear transmission, which, as is well known, embodies three speeds forward and one reverse. The ball type gear shift lever is positioned accessible to an operator of a tractor or automobile and is mounted for universal movement in the top plate 10 of the gear enclosing transmission housing. This plate 10 is provided on its under side with a bearing 11 which receives the conventional ball 12 of a hand shift lever 13, the ball being free in the bearing for universal movement. An enclosing collar 14 is carried on the top side of the plate, the plate, bearing, and collar all being securely fastened together by suitable bolts 15, the hand lever extending upwardly through the collar. Surrounding the upper end of the lever is a flexible protective member 16 which loosely hugs the lever at its upper end and is clamped to the collar 14 by means of an annular clamp 17 at its lower end, thus effectively shutting out dirt. As is usual, the hand lever extends below the ball 12, as clearly shown in Fig. 1. A wall 18 of the transmission casing carries for movement therethrough, the usual sliding keys or rods 19 which carry and operate the shipper forks, not shown, for effecting a sliding of the gears in the transmission casing. These sliding keys are provided with conventional hooked ends 20 adapted to be engaged by the usual ball 21 at the lower end of the hand lever. The usual spring pressed, yieldable pawls 22 are likewise shown, the purpose of which is, as is well known, to prevent disengagement or unmeshing of the gearing in adjusted position.

Where the gearing in transmission mechanisms are precisely cut these locking pawls 22 just mentioned are sufficient for retaining the gearing in mesh; however, in volume production where precision gearing are not always turned out, and even where the gears are precise in the first instance, they become worn after extensive use and their teeth beveled to such an extent that, especially when driving in the lower speeds for heavy duty work, the gearing will not remain in mesh, because these pawls are insufficient. The hand lever thus frequently becomes unlocked, wherein lies the problem which this invention proposes to solve. Bolted by means of bolts 23 to the wall of the transmission casing 18 is a bracket or guide member 24 comprising a vertically disposed wall portion 25 which is slotted intermediately of its ends as shown in Fig. 4. Integrally formed with the vertical wall near its lower end is a locking plate 26, a part of which is disposed on each side of the wall 25 and extending therealong a differential distance; that is, the plate extends a greater distance along one side of the wall 25 than on the other, for, as is well known, such construction is necessary in effecting sliding movements of the lever for making the different adjustments, as the throw of the lever varies for each adjustment. At the lower termination of the vertical slot in the wall 25 and disposed centrally in the plate 26 is an aperture 27 which receives an integral extension 28 of the hand lever below the ball 21. In the neutral position of the lever, this extension 28 rests in the aperture 27 in the locking plate.

It will be observed that the lower end of the bearing 11 has fitted thereover and around the lever a cap 29, against which is seated a coil spring 30 encircling the lever and abutting at its other end against a washer 31 held in place on the lever by a pin 32. The spring 30 being under compression the hand lever is normally pulled downwardly so that when the extension 28 is in the neutral position it will be kept there by the spring. It will be observed that there are four end edges (Fig. 3) of the opposed ledges of the plate 26 and that by pulling the hand lever upwardly axially of its length the extension 28 may be disengaged from the neutral position and shifted in the conventional way to any of these end positions whereupon release of the lever will permit the spring to exert a force which will pull the lever downwardly so that the extension 28 will catch or lock over the particular end selected. This vertical axial movement of the lever is permitted and limited by the construction of the collar 14, shown clearly in Fig. 1. Of course, when raising the lever and moving it laterally, the hook 20 of one of the sliding keys is engaged by the ball 21 and when the lever is shifted to one of the positions of adjustment the key is, of course, carried with it, thereby moving the shipper fork (not shown) to change the mesh of the gearing in the transmission casing.

As has been said, the preferred embodiment of the invention only has been shown, and certain modifications will readily suggest themselves to the skilled workman. For instance the ball 12 of the hand lever may be fixed and mounted only for universal movement, with the lever slidable axially of its length relatively to the ball 12 by means of a through-hold in the ball. In such a construction a spring would not be necessary, for the lever could drop into adjusted position by gravity; also the plate 26 need not be made integral with the wall 25 of the guiding bracket, for angle irons of differential lengths could be bolted or riveted to the opposit sides of the wall 25 and serve the same purpose.

It will thus be seen that there is herein provided apparatus in which the several objects of this invention are achieved and that the same is simple in construction yet dependable in action and that it is well adapted to meet the exacting conditions of hard, practical use.

As already pointed out, the form of the invention herewith shown and described is to be taken as a preferred example of the same, and that various changes in the shape, size, arrangement and construction may be resorted to without departing from the spirit of the invention or the scope of the appended claims is to be understood.

What is claimed is:

1. In a gear shifting mechanism, a housing therefor, a lever mounted in the housing for universal movement, a stationary guide member carried by the housing, and cooperating means on the lever and guide member for retaining the lever in adjusted position.

2. In a gear shifting mechanism, a housing therefor, a lever universally mounted in the housing intermediately of its ends, a guide member carried by said housing, the lower end of the lever being engageable with the guide in one position to lock it, and being bodily and axially movable to unlock the lever end and permit its transfer to another position to lock it in the new position.

3. In a gear shifting mechanism, a housing therefor, a lever mounted in the housing for universal movement, a stationary guide and locking member carried by the housing, and means for normally holding the lever in engagement with the member, said lever being axially and bodily movable to be disengaged from said member.

4. In a gear shifting mechanism, a housing therefor, a lever universally mounted therein intermediately of its ends, a guide for the lever carried by the housing, locking devices on the guide, the lower end of the lever normally engaging one of said devices, the lever being axially and bodily movable for disengagement of said end from said device and permitting the same to be shifted to engage another locking device.

5. In a gear shifting mechanism, a housing therefor, a lever mounted therein, a guide for the lever carried by the housing, a locking plate on the guide and extending therealong on each side thereof, said lever movable through the guide to engage the ends of the locking plate for retaining the lever in such position of adjustment.

6. In a gear shifting mechanism, a housing therefor, a lever mounted therein, a guide for the lever carried by the housing, a locking plate on the guide and provided with a central aperture for receiving the end of the lever in neutral position, the locking plate extending along opposite sides of the guide, the lever being axially movable out of neutral to be moved to engage over any end of the locking plate for holding the lever in any of these positions of adjustment.

7. In a gear shifting mechanism, a housing therefor, a lever mounted therein, a vertical guide carried on the housing, a horizontally disposed plate extending along opposite sides of the guide, the lever being movable through the guide and therealong to engage the ends of the plate.

8. In a gear shifting mechanism, a housing therefor, a lever mounted therein, a vertical guide carried on the housing, a horizontally disposed plate extending along opposite sides of the guide, the lever being movable through the guide and therealong to engage the ends of the plate, and means exerting a force on the lever to retain it locked behind any selected end of the plate.

9. In a gear shifting mechanism, a housing therefor, a lever mounted therein for universal and axial movement, a vertically disposed slotted guide carried on the housing, and a horizontally disposed apertured locking plate extending along and on opposite sides of the guide, the lever movable through the guide and having an extension normally engageable with the aperture in the plate and axially movable to be shifted to engage selectively and lock over any end of the plate on either side of the guide for retaining the lever in adjusted position.

10. In a gear shifting mechanism, a housing therefor, a lever mounted therein for universal and axial movement, a vertically disposed slotted guide carried on the housing, a horizontally disposed apertured locking plate extending along and on opposite sides of the guide, the lever movable through the guide and having an extension normally engageable with the aperture in the plate and axially movable to be shifted to engage selectively and lock over any end of the plate on either side of the guide for retaining the lever in adjusted position, and a spring encircling the lever for exerting a force to pull it downwardly to retain the extension on the lever locked in engagement with the aperture or any of the selected ends of the plate.

11. In a gear shifting mechanism, a housing therefor, a unitary lever mounted in the housing for universal movement and having its lower end normally locked in an adjusted position, said lever being bodily and axially movable for effecting unlocking and shifting thereof to another position of adjustment.

12. In a gear shifting mechanism, a housing therefor, a lever including an integrally formed ball mounted for universal and axial movement in the housing, means engageable by the lever for shifting gears, and means for locking the lever in any of a plurality of positions of adjustment.

13. In a gear shifting mechanism, a housing therefor, a lever mounted for universal and axial movement in the housing, means engageable by the lever for shifting gears, a locking plate, and means for automatically locking the lever with respect to the plate in adjusted position.

14. In a gear shifting mechanism, a housing therefor, a lever in the housing for effecting gear shifting, means for locking the lower end of the lever in any one of a plurality of positions of adjustment, and means permitting a bodily displacement of the lever to unlock its lower end for effecting a shift to another position of adjustment.

In testimony whereof I affix my signature.

OTTO R. SCHOENROCK.